United States Patent
Elliott

(10) Patent No.: US 6,478,542 B1
(45) Date of Patent: Nov. 12, 2002

(54) VARIABLE PITCH PROPELLER HAVING CENTRIFUGAL LOCK

(76) Inventor: Morris C. Elliott, 11723 Norino Dr., Whittier, CA (US) 90601

(*) Notice: Subject to any disclaimer, the term of this patent is extended or adjusted under 35 U.S.C. 154(b) by 31 days.

(21) Appl. No.: 09/838,768

(22) Filed: Apr. 19, 2001

(51) Int. Cl.[7] .............................................. B64C 11/42
(52) U.S. Cl. ...................... 416/61; 416/154; 416/157 R
(58) Field of Search ........................... 416/61, 153, 154, 416/159, 162, 157 R

(56) References Cited

U.S. PATENT DOCUMENTS

| | | | | |
|---|---|---|---|---|
| 1,509,944 | A | * | 9/1924 | Forgette et al. ............. 416/153 |
| 2,433,990 | A | * | 1/1948 | Hardy ......................... 416/154 |
| 2,491,375 | A | * | 12/1949 | Hardy ......................... 416/154 |
| 2,515,037 | A | * | 7/1950 | Hardy ......................... 416/154 |
| 2,588,166 | A | * | 3/1952 | Sacchini ................. 416/154 X |
| 4,362,467 | A | | 12/1982 | Elliott |
| 5,967,750 | A | | 10/1999 | Elliott |
| 6,276,898 | B1 | | 8/2001 | Elliott |

FOREIGN PATENT DOCUMENTS

GB 534529 * 3/1941 ................. 416/154

* cited by examiner

*Primary Examiner*—John E. Ryznic
(74) *Attorney, Agent, or Firm*—Sheldon & Mak

(57) ABSTRACT

A variable pitch propeller has a centrifugal lock for blocking blade pitch changes from a normal range of forward pitch angles toward both feathered and reverse positions at rotational speeds greater than a predetermined threshold. The lock mechanism has a pair of stop members rigidly connected to a rack yoke member that has geared engagement with respective propeller blade pinions, and a pair of mass elements that move outwardly in response to centrifugal force to block movement of the lock members outside of the normal range. A pair of springs are connected between the mass elements for biasing them inwardly from paths of the lock members. The yoke is displaced axially by an actuator having an annular hydraulic cylinder. A hydraulic control unit having a motorized leadscrew coupled to another annular hydraulic cylinder is fluid coupled to the actuator, and a simple control circuit provides colored indications of pitch settings.

20 Claims, 5 Drawing Sheets

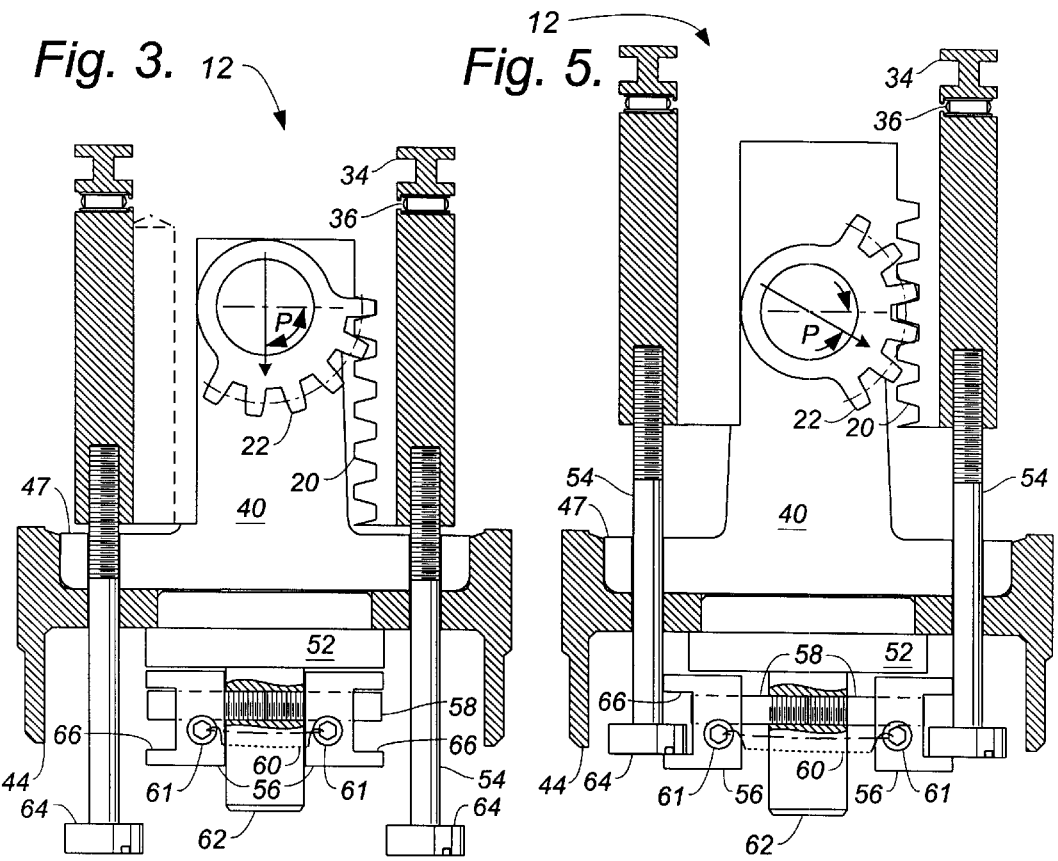
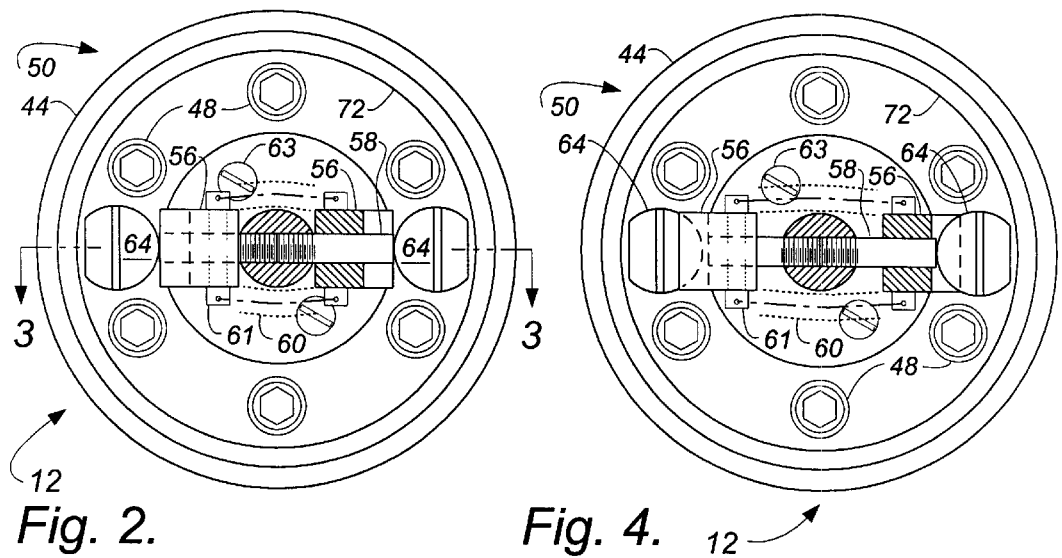
Fig. 3. Fig. 5.
Fig. 2. Fig. 4.

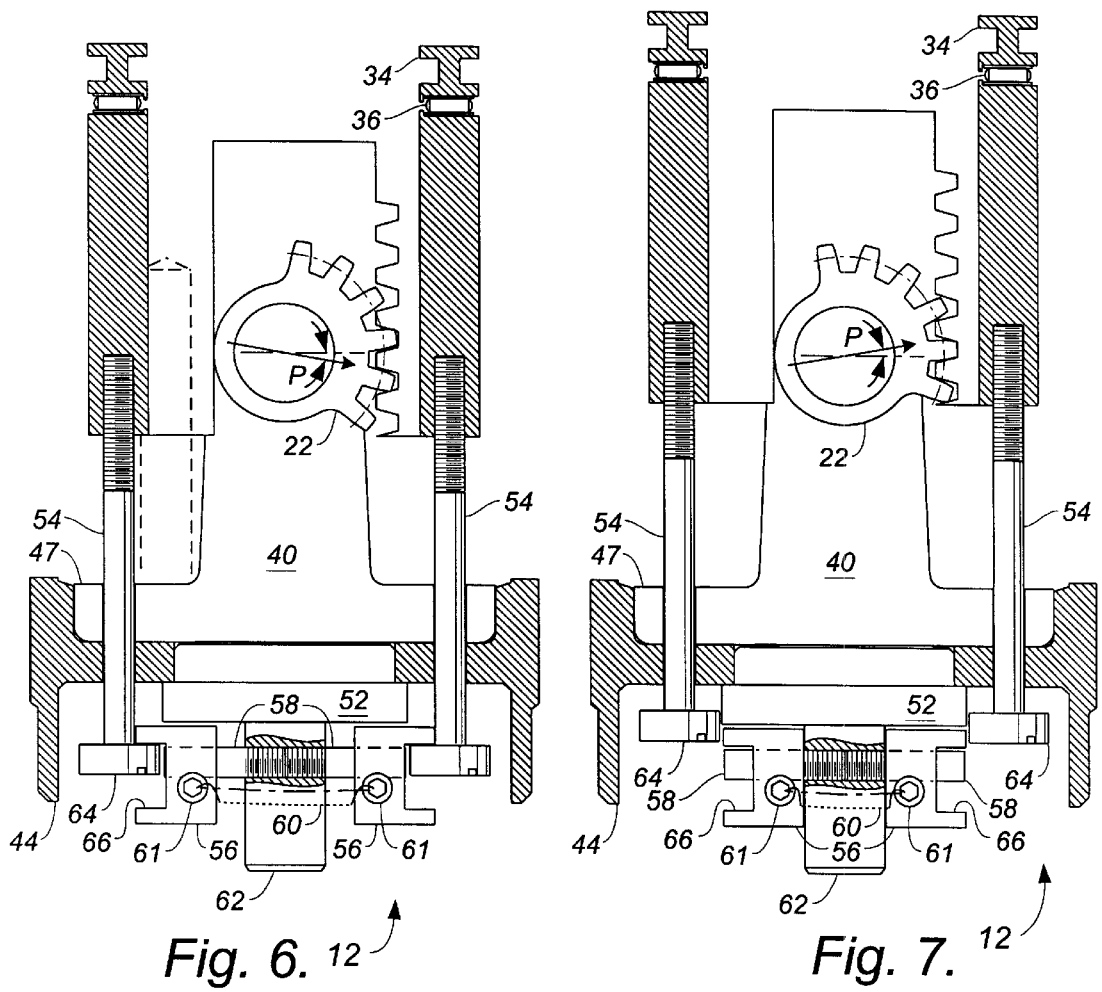

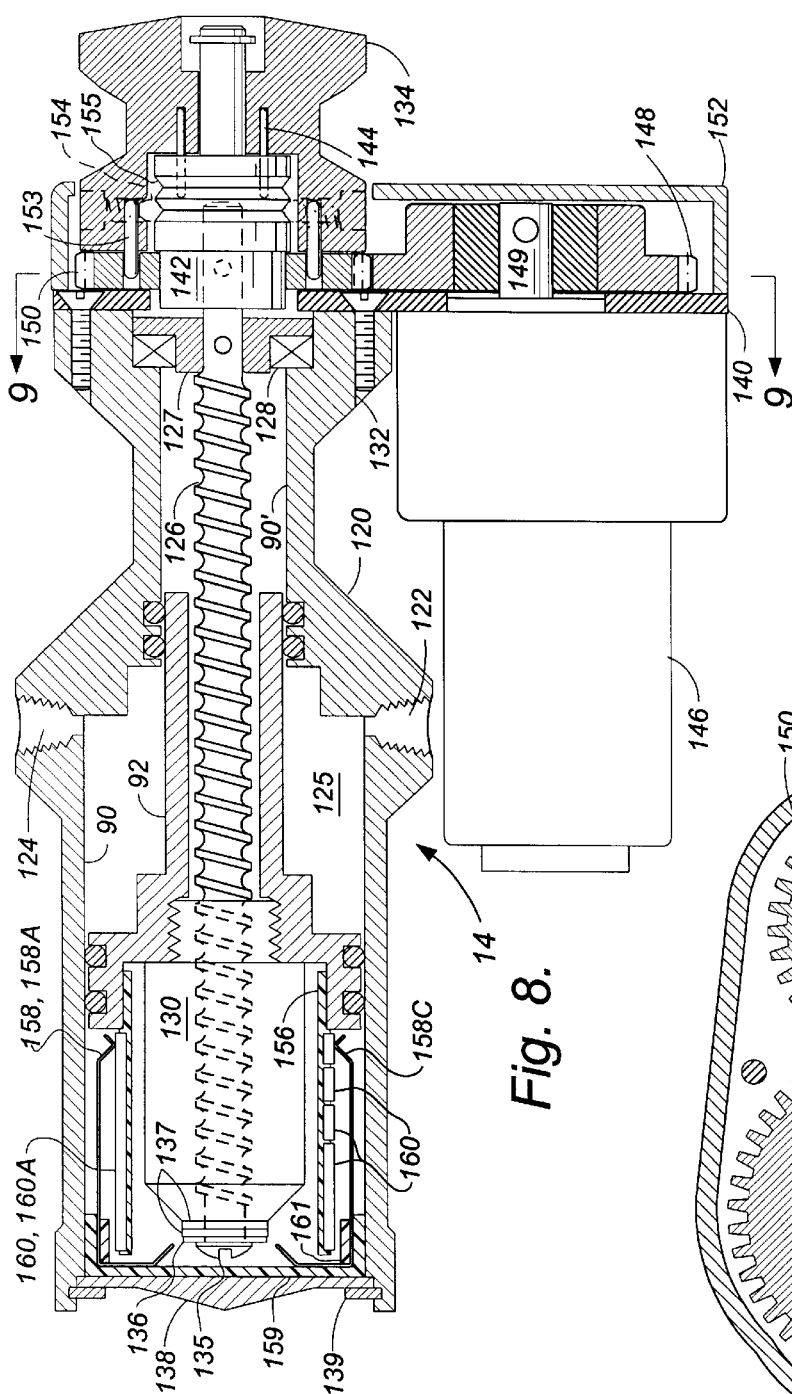
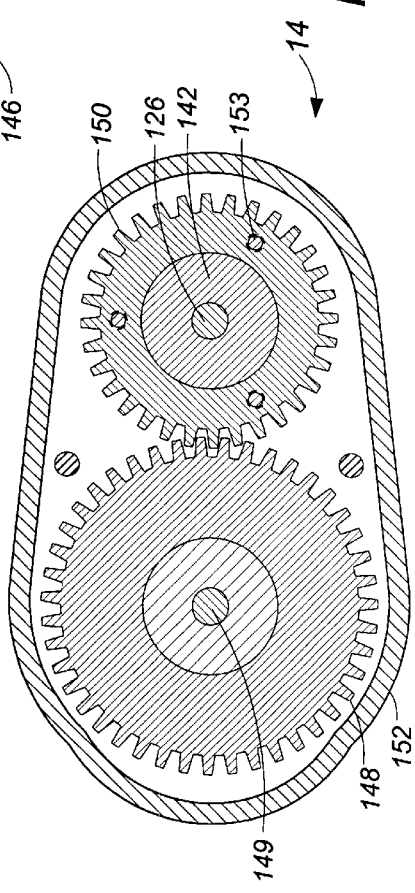
Fig. 8.
Fig. 9.

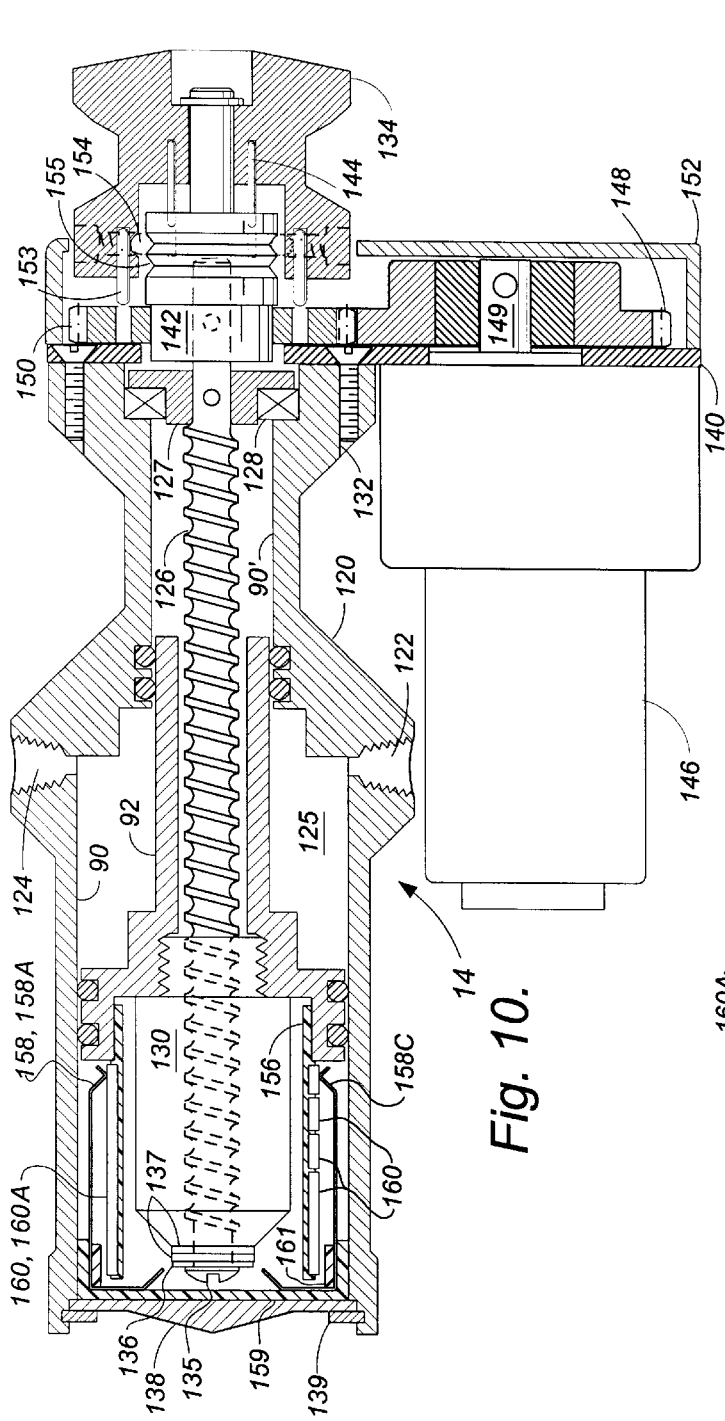
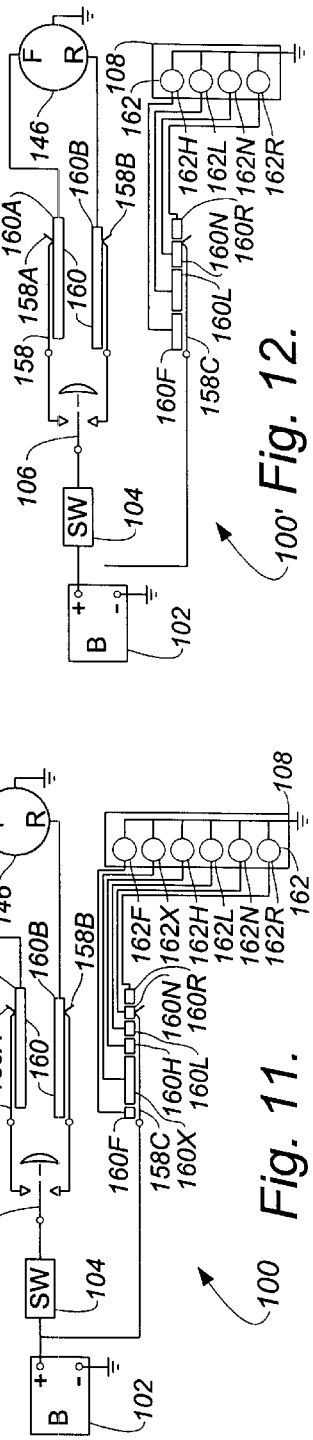
Fig. 10.
Fig. 11.
Fig. 12.

VARIABLE PITCH PROPELLER HAVING CENTRIFUGAL LOCK

BACKGROUND

The present invention relates to variable pitch propellers for aircraft and water craft, and more particularly to such propellers having a range of forwardly driving pitch angles and one or both of feathered and reverse pitch angles wherein moving outside of the range of driving pitch angles is undesirable except under appropriate operating conditions.

In existing variable pitch propeller propulsion systems, it is often required or desired to include feathered and/or reverse pitch angles for operations other than forward propulsion. In aircraft, for example, it is highly desirable to have a feathered pitch capability in case of engine failure, as well as a reverse pitch capability for braking in landings as well as for enhanced taxiing maneuverability. However, inadvertent or accidental activation of either of these additional pitch positions is harmful and dangerous except under certain conditions. For example:

1. Reverse pitch is generally never safe in flight, giving rise to loss of control and, particularly at high air speeds, mechanical failure; and
2. Feathered pitch is unsafe unless there is engine failure, in which case there is a danger that feathered pitch may be activated on a propeller other than that of the failed engine.

Thus there is a need for a variable pitch propeller system that provides feathered and/or reverse pitch operation automatically only under prescribed conditions.

SUMMARY

The present invention meets this need by providing a variable pitch propeller system having feathered and/or reverse pitch operation in addition to a normal range of forwardly driving pitch positions, wherein activation of a pitch angle outside of the normal range is blocked at rotational speeds above a predetermined threshold. In one aspect of the invention, a variable pitch propeller apparatus includes an input shaft for coupling to a rotary power source on a drive axis; a plurality of propulsion blades rotatably supported relative to the drive shaft on respective blade axes, the blade axes diverging from the drive axis; an actuator having a yoke member supported relative to the drive shaft for movement therewith and coupled to the propulsion blades for rotation thereof about respective ones of the blade axes, the yoke member having a normal range of yoke positions from a high pitch position to a low pitch position, and an additional yoke position outside of the normal range, the propulsion blades having a corresponding normal pitch angle range including a high pitch angle and a low pitch angle, and an additional pitch angle outside of the normal pitch angle range corresponding to the additional yoke position; and a centrifugal lock mechanism for blocking the movement of the yoke member from the normal range of yoke positions toward the additional yoke position in response to rotational speed of the input shaft being greater than a predetermined threshold speed.

The lock mechanism can include a stop member rigidly connected to the yoke member and having a shoulder surface oriented generally perpendicular to a direction of movement of the yoke member; a mass element coupled to the input shaft for movement from an unlock position to a lock position displaced outwardly from the drive axis relative to the unlock position in response to centrifugal force, the mass element moving in predetermined relation to the drive shaft, the mass element in the lock position thereof blocking the lock member and the yoke member from moving from the normal range of yoke positions toward the additional yoke position by engagement with the shoulder surface; and means for biasing the mass elements toward the unlock position. The lock member is a first lock member and the mass element is a first mass element, the lock mechanism also including a second lock member and a second mass element symmetrically located opposite the drive axis, and wherein the means for biasing comprises a tension spring coupled between the first and second mass elements.

The additional yoke position can be any one of a feathered position opposite the high pitch position from the low pitch position, the propulsion blades having a corresponding feathered pitch angle; and a reverse yoke position opposite the low pitch position from the high pitch position, the propulsion blades having a corresponding reverse pitch angle. Also, there can be first and second additional yoke positions, on opposite sides of the normal range of yoke positions, the propulsion blades having corresponding first and second additional pitch angles. Further, the additional pitch angles can be feathered and reverse, being spaced apart by at least 100 degrees.

When the apparatus provides the first and second additional yoke positions, the lock mechanism can include the stop member having oppositely facing shoulder surfaces; the mass element moving from the normal range of yoke positions toward the first additional position by engagement with the first shoulder surface and from the normal range of yoke positions toward the second additional yoke position by engagement with the second shoulder surface; and the means for biasing the mass element toward the unlock position.

The threshold speed can be predetermined to be not greater than 1500 RPM, a preferred value being approximately 1200 RPM. The actuator can include an annular hydraulic cylinder rotatably supported relative to the drive shaft, and an annular piston sealingly movable in the hydraulic cylinder for axially displacing the yoke member. Preferably an antifriction thrust bearing is interposed between the yoke member and the annular piston, the annular hydraulic cylinder with suitable means for preventing rotation of the hydraulic cylinder during rotation of the input shaft.

The invention also provides a variable pitch propeller system including a hydraulic control unit for connecting to a fluid port of the power actuator to controllably advance the actuator piston, the controller including a housing forming a primary hydraulic cylinder; a control piston sealingly slidably engaging the primary hydraulic cylinder for forming a closed fluid cavity of variable volume in fluid communication with the fluid port when the control unit is connected to the actuator; and a lead screw rotatably supported in the housing and having a lead screw nut assembled thereto and rigidly connected to the control cylinder, the lead screw being rotatably axially supported within the housing for advancing the control piston at high mechanical advantage in response to rotation of the lead screw, the pitch of the blades being adjustable in response to rotation of the lead screw. The lead screw nut can be configured as an antifriction nut that is threadingly engaged with the lead screw by means of a plurality of rollingly interposed elements, the lead screw being axially supported within the housing by an antifriction thrust bearing.

The control unit can also include an indicator spring contact supported relative to the housing, and a plurality of indicator contact members supported relative to the lead screw nut for sequential engagement by the indicator spring contact in response to rotation of the lead screw for signaling positions of the control piston to an external device. The propeller system of claim 15, further comprising a plurality of display elements electrically connected to respective ones of the indicator contact members for activation in corresponding positions of the control piston. The display elements can be differently colored illuminators. The control unit can also have a control motor coupled to the lead screw for reversibly driving the screw in response to respective forward and reverse drive signals; respective forward and reverse spring contacts supported relative to the housing, and respective forward and reverse contact members supported relative to the lead screw nut for sliding engagement by corresponding ones of the spring contacts, each of the forward and reverse drive signals being fed serially through corresponding ones of the spring contacts and contact members to the control motor; and each of the forward and reverse contact members being foreshortened in a direction corresponding to movement of the lead screw nut in response to activation of a respective one of the drive signals for deactivating the control motor at opposite extremities of travel of the control piston.

The propeller apparatus can include two of the blade members that project from opposite sides of the hub.

DRAWINGS

These and other features, aspects, and advantages of the present invention will become better understood with reference to the following description, appended claims, and accompanying drawings, where:

FIG. 2 is an axial sectional view of the unit of FIG. 1 on line 2—2 therein;

FIG. 3 is a fragmentary sectional view of the propeller unit of FIG. 1 on line 3—3 therein, showing the low-speed feathered condition;

FIG. 4 is a sectional view as in FIG. 2, showing the unit of FIG. 1 in a high-speed, normal pitch condition;

FIG. 5 is a sectional view as in FIG. 3, showing the unit of FIG. 1 in a high pitch extremity of the condition of FIG. 4;

FIG. 6 is a sectional view as in FIG. 3, showing the unit of FIG. 1 in a low pitch extremity of the condition of FIG. 4;

FIG. 7 is a sectional view as in FIG. 3, showing the unit of FIG. 1 in a low-speed, reverse pitch condition;

FIG. 8 is a lateral sectional view of a control unit portion the propeller system of FIG. 1, in a manual mode condition;

FIG. 9 is a sectional view on line 9—9 of FIG. 7;

FIG. 10 is a sectional view as in FIG. 8, showing the control unit in a powered mode condition;

FIG. 11 is a pictorial diagram showing the control unit of FIG. 8 in an electrical circuit; and FIG. 12 is a pictorial diagram as in FIG. 11, showing an alternative configuration of the electrical circuit.

DESCRIPTION

Figure 1:
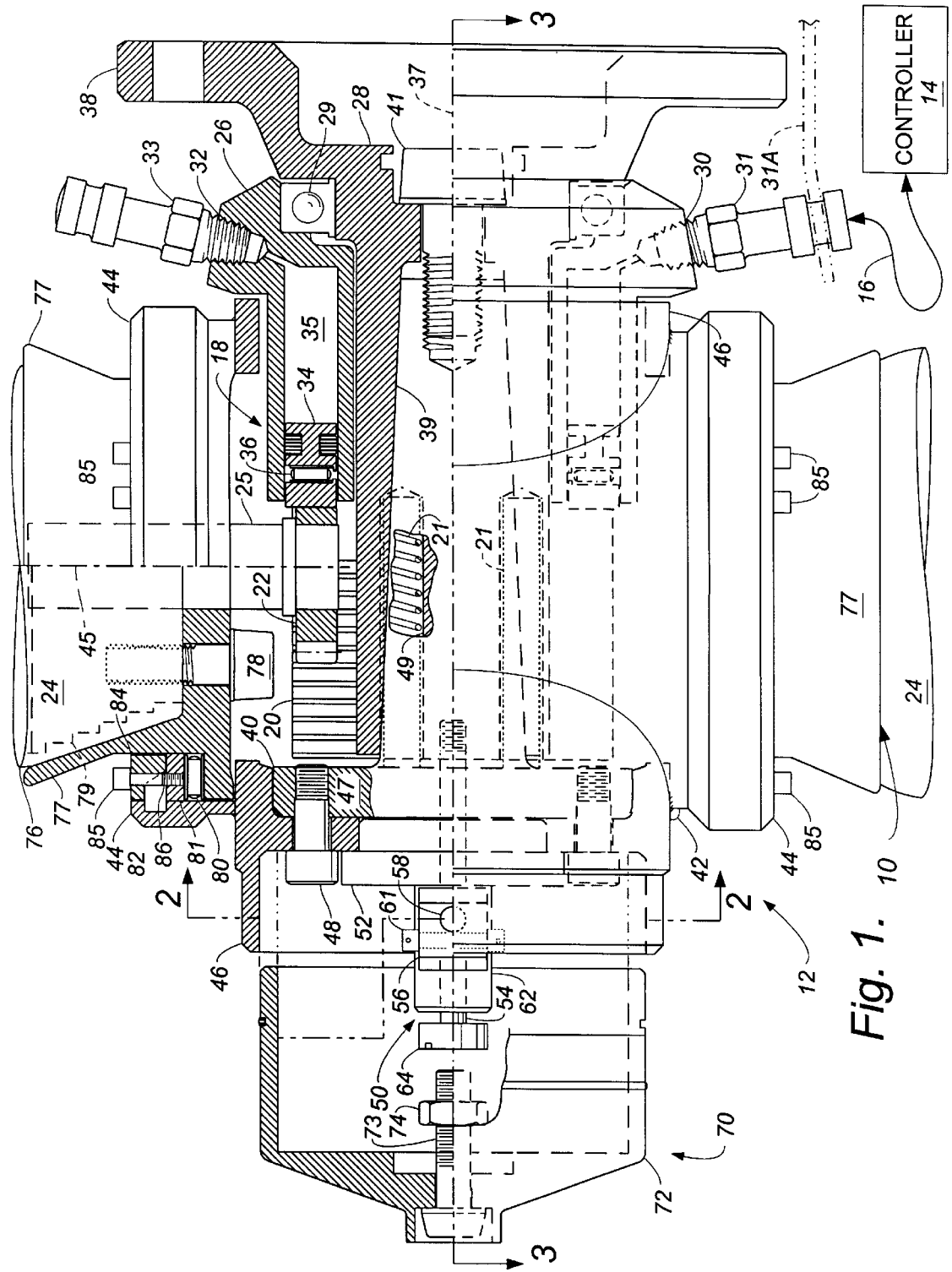
FIG. 1 is a fragmentary sectional side view of a variable pitch propeller unit according to the present invention, the unit being in a low-speed, feathered condition.

The present invention is directed to a variable pitch propeller system for vehicles such as aircraft, that is particularly effective for providing a wide range of pitch settings while preventing entry of certain pitch settings at unsafely high rotational speeds. For example, the present invention contemplates one or both of feathered and reverse pitch settings in addition to a range of forward pitch settings. As indicated above, it is generally considered unsafe, on airworthyness and/or structural integrity grounds, to enter the feathered pitch setting at high RPM, and to enter the reverse pitch setting anytime in flight. With reference to FIGS. 1–11 of the drawings, a variable pitch propeller system 10 includes a propeller unit 12 and a remotely connected controller 14. In the exemplary configuration shown in the drawings, the controller 14 is in the form of a variable displacement hydraulic reservoir that is fluid-connected through a control line 16 to an annular hydraulic actuator 18 of the propeller unit, the actuator driving a rack yoke 20 in opposition to a plurality of retraction springs 21, the yoke 20 having geared engagement with respective blade pinions 22 of the propeller unit for adjusting respective pitch angles of corresponding propeller blades 24 generally as described in the inventor's previous U.S. Pat. No. 4,362,467, which is incorporated herein by reference, the blade pinions 22 being mounted on respective pinion shafts 25 that project inwardly from corresponding ones of the propeller blades 24.

More particularly, the hydraulic actuator 18 includes a hydraulic cylinder 26 that surrounds and is rotationally supported relative to a main input shaft 28 by an antifriction radial/thrust bearing 29, the cylinder 26 having a control port 30 for receiving a suitable fitting 31 connecting the control line 16, and an oppositely oriented vent port 32, a fill/bleed valve 33 being installed in the vent port 32 as shown in FIG. 1. An annular piston 34 is sealingly axially movable in the cylinder 26 to form a closed fluid chamber 35 in fluid communication with the ports 30 and 32, and an antifriction thrust bearing 36 is interposed between the piston 34 and the rack yoke 20 as further shown in FIG. 1. As described further below, the rack yoke 20 rotates with the main input shaft 28, and the hydraulic cylinder 26 (together with the annular piston 34) is restrained from rotating by suitable means such as an anchor bracket 31A that holds the fitting 31 with the fill/bleed valve 33 upwardly oriented relative to the fluid chamber 35. Thus the hydraulic cylinder 26, the annular piston 34, and the thrust bearing 36 are each concentric with the main input shaft 28 on an drive axis 37. The main input shaft 28 has a flang portion 38 that is suitably configured for securing to an end extremity of an engine output shaft (not shown) for rotation about the drive axis 37, the input shaft also having an internal taper 39 for concentrically receiving a taper flange 40 that rigidly connects a hub member 42 to the main input shaft 28, the taper engagement being secured by a cap screw 41 that projects through the input shaft 28 and threadingly engages the taper flange 40. The input shaft and the taper flange together function as a drive shaft of the propeller unit 12. Conventionally, the main input shaft 28 is considered to project forwardly from the flange portion 38 thereof, so that the hydraulic cylinder 26 extends forwardly from the bearing 29 and the taper flange 40 extends forwardly from the main input shaft 28, etc. It will be understood that these relationships are reversed in "pusher" configurations.

The hub member 42 has respective hub boss portions 44 within which the propeller blades 24 are retained and rotatably supported on respective blade axes 45 as further described below, the blade axes diverging from the drive axis 37, a shaft portion 46 of the hub member 42 being fastened to a forwardly projecting flange portion 47 of the taper flange 40 by a plurality of axially oriented hub fasteners 48. The retraction springs 21 are oriented parallel to the drive axis 37 and located within respective spring cavities 49 of the rack yoke 20, bearing against the rear of the flange portion 47 of the taper flange 40. In the exemplary configuration of the propeller unit 12, the propeller blades 24 are movable from a feathered position denoted by the forwardly directed arrow in FIG. 3 wherein the actuator 18 is fully extended, to a full reverse position denoted by the obliquely rearwardly directed arrow in FIG. 9, wherein the actuator 18 is fully retracted. The feathered position is at a pitch angle P of approximately 90 degrees, whereas the reverse position is typically at a pitch angle on the order of −10 degrees, the propeller blades 24 turning through approximately 100 degrees between the feathered and reverse positions. Extension of the actuator 18 is effected by forcing hydraulic fluid from the controller 14 into the fluid chamber 35, whereas retraction is effected by allowing hydraulic fluid to escape the chamber 35, being received by the controller 14, the rack yoke 20, the thrust bearing 36, and the annular piston 34 being together displaced rearwardly by the retraction springs 21.

An important feature of the present invention is a centrifugal lock mechanism 50 that is supported forwardly of the taper flange 40 for preventing high RPM pitch changes to outside of a normal range of forward pitch settings bounded by a low pitch condition shown in FIG. 6, and a high pitch condition shown in FIG. 5, the high and low pitch conditions corresponding to respective high and low pitch positions of the actuator 18 denoted by corresponding obliquely forwardly directed arrows in FIGS. 5 and 6, respectively. The pitch angle P in the low pitch position can be approximately 10 degrees as shown in FIG. 6, the angle P in the high pitch position being on the order of 30 degrees in the high pitch position as shown in FIG. 5. The lock assembly 50 has a base member 52 that is concentrically located on the input axis by the shaft portion 46 of the hub 42, a pair of base fasteners 53 securing the base member in place by engagement with the taper flange 40. Thus the base member 52 rotates as a unit with the hub member 42, the taper flange 40, and the main input shaft 28. It will be understood that the base member 52 can alternatively be formed integrally with the taper flange 40 and/or the hub member 42.

The lock mechanism 50 also includes a pair of headed stop screws 54 that fixedly project forwardly from the rack yoke 20 through the flange portion 47 of the taper flange 40 and a portion of the hub member shaft portion 46, with which the stop screws 54 have sliding engagement, moving axially as a unit with the rack yoke 20. A pair of centrifugal mass elements, designated lock members 56, are slidingly supported on respective cylindrical guide members 58 that rigidly project radially from opposite sides of the base member 52 for blocking movement of the stop screws 54 as described herein. More particularly, the stop members are driven outwardly by centrifugal force associated with rotation of the propeller unit 12 about the input axis 37, being biased inwardly by a pair of tension springs 60. In the exemplary configuration shown in the drawings, opposite ends of each tension spring 60 are hooked to respective spring fasteners 61 that threadingly engage corresponding ones of the lock members 56. Thus the tension springs 60 pass between the lock members 56 on opposite sides of a reduced-diameter boss portion 62 of the base member 52, the guide members 58 being formed by headless fasteners having threaded engagement with the boss portion 62. It will be understood that other shapes of the boss portion 62 are contemplated, and the guide members 58 can also have non circularly cylindrical cross-sectional configurations.

Below a threshold rotational speed of the propeller unit 12, such as, for example, approximately 1200 RPM, the lock members are held by the tension springs 60 in an unlock position sufficiently inwardly toward the boss portion 62 to clear respective head portions 64 of the stop screws 54 as shown in FIGS. 2, 3, 8 and 9. However, at speeds above the threshold, the lock members 56 move outwardly on the guide members 58 to a lock position having an interfering relation with the head portions 64 as shown in FIGS. 4–6, except that such movement can be temporarily blocked in certain positions of the stop screws 54 as further described below. Each of the lock members 56 has an outwardly facing slot 66 formed therein for receiving an inwardly projecting side of the corresponding head portion 64 when the rack yoke 20 is positioned for producing pitch settings within the normal range of rotational speeds. Thus oppositely facing shoulder surfaces 64A and 64B of the stop screws 54 are confined between opposite sides of the slots 66 in the high-speed conditions of the propeller unit 12 shown in FIGS. 4–6.

Operation of the propeller system 10 of the present invention commences with the propeller unit at rest, and the actuator 18 can be extended to any degree between the feathered and reverse positions, although extensions approaching or beyond the high pitch position are normally avoided for ease in starting. Once rotation commences, the RPM is normally maintained below the threshold speed (1200 RPM for example) for a period of time during warmup and ground operations. Typically, the propeller unit is cycled over at least a portion of the full range of conditions between feathered and reverse during this initial period of time, with the threshold speed being exceeded only with the actuator being advanced not farther than the high pitch position. It will be understood that increasing the speed above the threshold with the actuator 18 in the reverse position or slightly beyond the high pitch position results in the head portions 64 of the stop screws 64 temporarily blocking outward movement of the lock members 56 from the first positions thereof. However, movement of the actuator 18 to within the normal range of positions (between the low and high pitch positions) unblocks the outward movement of the lock members, whereupon subsequent advancement or retraction of the actuator 18 outside of the normal range is prevented by the lock mechanism 50 as described above. Also, while retraction beyond the low pitch position toward the reverse position is prevented at speeds above the threshold, it is perfectly permissible to increase the speed once a position below the low pitch position is attained, and further retraction toward and fully to the reverse position is permitted during such subsequent high speed operation. Moreover, advancement from the reverse position into the normal range is permitted at high speed.

During flight, the speed of the propeller unit 12 is generally always above the threshold except in case of engine failure or intentional cutting of power for training exercises and the like. Thus the lock mechanism 50 of the present invention positively prevents movement of the actuator 18 beyond the high pitch position unless there has been a loss of power. Similarly, operation at or near the low pitch position in flight normally produces rotational speeds above the threshold, even without applied engine power. Thus the lock mechanism also prevents retraction of the actuator 18 beyond the low pitch position in flight, except in cases of engine seizure. Accordingly, the present invention provides protection against accidental pitch reversals and feathering in flight. This is a particularly important feature in multi-engine applications wherein isolation of a power failure to a particular engine may not be immediately apparent, and rapid response to the emergency is in order.

The centrifugal lock mechanism 50 is protected by a cap assembly 70 having a cap member 72 that sealingly engages the shaft portion 46 of the hub member 42, the cap member being secured in place by a cap screw 73 that threadingly engages the boss portion 62 of the base member 52. The cap screw 73 also carries a cap nut 74 by which the screw 73 is captured in engagement with the cap member 72. Thus withdrawal of the cap assembly from the hub member 42 is facilitated by the simple expedient of unscrewing the cap screw 73.

As further shown in FIG. 1, an exemplary configuration of the propeller blades 24 has composite construction, each of the blades having a carbon-reinforced blade member 76, an inward end extremity of the blade member being rigidly received in a socket member 77 and clamped in place by a plurality of cap screws 78, the screws 78 threading a stepped plug member 79 that is molded within the blade member 76. Each of the socket members 77 is rotatably supported within a corresponding one of the hub boss portions 44, centrifugal loading being transmitted by an anti-friction thrust bearing 80 to the boss portion as described herein. The thrust bearing 80 abuts a plurality of arcuate pressure plates 81 that are retained by a corresponding plurality of arcuate shear keys 82, the shear keys 82 projecting into an inside groove 83 of the boss portion 44. The shear keys 82 are driven radially outwardly into the groove 83 by a corresponding plurality of arcuate cover plates 84, the shear keys 82 being clamped between the cover plates 84 and the pressure plates 81 by a plurality of retainer screws 85 that threadingly engage the pressure plates 81. Inner arcuate portions of the shear keys 82 are beveled, corresponding portions of the cover plates also being beveled as indicated at 86 for urging the keys 82 outwardly as the screws 85 are tightened. The pressure plates 81, the shear keys 82, and the cover plates 84 form respective ring-shaped arrays, typically having three segments each, for facilitating assembly of the blades 24 without requiring these components to be passed over the full length of the blade members 76. (Raceways of the thrust bearing 80 can be cut into pairs of segments for assembly past the enlarged outer extremity of the socket member 77.)

With particular reference to FIGS. 8–10, an exemplary configuration of the control unit 18 that is selectively operable in both manual and powered modes, includes a hydraulic control cylinder 90 formed at one end of a housing 120, a smaller counterpart of the cylinder, designated 90', being also formed in the housing in axially spaced relation to the cylinder 90. An annular piston 92 has sealed sliding engagement with the cylinders 90 and 90', the housing 120 also having respective feed and bleed ports 122 and 124 formed in opposite walls thereof for correspondingly receiving an opposite end fitting (not shown) of the control line 16, and a counterpart of the fill/bleed valve 33. The ports 122 and 124 are in fluid communication with a fluid chamber 125, a volume thereof varying by an axial travel distance of the piston 92 multiplied by that portion of the area of the cylinder 90 that is outside of the cylinder 90'. A ballscrew 126 is rotatably supported in the housing by a thrust bushing 127 for axially positioning the piston 92 in the cylinder 90, a suitable antifriction thrust bearing 128 being interposed between the bushing and the housing 120. The ballscrew 126 has a ballnut 130 assembled thereto, the ballnut being rigidly connected to the piston 92 by threaded engagement therewith for advancing the piston 92 toward the bearing 128 against fluid pressure in the chamber 125 in response to rotation of the ballscrew 126. The thrust bearing 128 axially supports the ballscrew 126 during forced advancement of the control piston 92 to expel hydraulic fluid from the chamber 125, movement in the opposite direction being generally unopposed in that the retraction springs 21 of the propeller unit 12 are effective for driving the propeller blades 24, the rack yoke 20, and the annular piston 34 to produce fluid flow into the fluid chamber 125 during retraction of the control piston 92, the piston being shown fully retracted in FIGS. 8 and 10. If necessary or desired, suitable means such as an axially oriented pin can be used for preventing rotation of the piston 92 relative to the housing 120, such pin being anchored to one of the housing 120 and the piston, and having sliding engagement with the other. The ballscrew 126 may be made from a length of commercially available stock, designated R-308 (3/8 inch diameter× 0.125 lead). A suitable ballnut for use as the ballnut 130 is available as No. 8103-448-003 (R-0308 without flange or wiper) from Warner Electric Brake & Clutch Co. of South Deloit, Ill. Alternatively, for increased loading capacity, and/or if frictional behavior is desired, an acme lead screw and nut can be substituted for the ballscrew 126 and the ballnut 130.

The housing 120 has fastener openings 132 for mounting to suitable structure such as a control panel (not shown) and/or a motor plate 140, described below. A control knob 134 is selectively rotatably coupled to the ballscrew 126 as described below for advancing the piston 92 at high mechanical advantage and low frictional resistance. A stop screw 135 with an accompanying large pattern stop washer 136 prevents movement of the ballnut 130 beyond the free end of the ballscrew 126. Also, one or more calibration washers 137 are interposed between the ballnut 130 and the washer 136 for adjusting a full-scale hydraulic volume displacement of the control unit 18 to match that of the propeller unit 12. An end plate 138 and a retainer ring 139 therefor are included in the control unit 18 for excluding dust and other contamination from the ballnut 130 and from otherwise exposed portions of the cylinder 90.

A clutch bushing 142 is rigidly fastened on the ballscrew 126, the bushing projecting from the motor plate opposite the housing 120. A control knob 134 is slidably supported on the clutch bushing 142, being coupled for rotation therewith by a pair of axially oriented dowel pins 144. A control motor 146 is mounted to the motor plate 140 in parallel spaced relation to the ballscrew 126, a drive gear 148 being mounted to an output shaft 149 of the motor and engaging a driven gear 150 that is freely rotatably supported on the clutch bushing 142 when the clutch knob is in an axially withdrawn first position relative to the bushing 142 as shown in FIG. 10. Thus, when the knob 134 is in the first position, the motor 146 is effectively disengaged, the control unit 18 being in a manual mode and operable by manually rotating the control knob 134. The control knob 134 projects through a gear cover 152 that is fastened to the motor plate 140, enclosing the gears 148 and 150.

A pair of coupling pins 153 project from the control knob 134 for engaging the driven gear 150 when the knob is in an axially inwardly displaced second position relative to the bushing 142 as shown in FIG. 8. Thus, when the knob 134 is in the second position, operation of the control unit 18 is in a powered mode in respnse to suitable electrical signals to the control motor 146. In the first position of the knob, the pins 153 are withdrawn clear of the driven gear 150 as shown in FIG. 10. The control knob 134 is provided with an angularly spaced plurality of springballs 154 that detent in respective axially spaced grooves 155 of the clutch bushing 142 for releasably holding the knob 134 in the corresponding first and second positions thereof.

With particular reference to FIGS. 10 and 11, an exemplary configuration of the control unit 14 is connected in a particularly simple and inexpensive control circuit 100, being powered from a suitable battery 102 having conventional charging means (not shown) and a main switch 104, which can be an engine ignition switch in appropriate circumstances. The control circuit 100 also includes a display 108 for indicating pitch settings of the propeller system 10. Further, within the housing 120 of the control unit .14, an electrically insulative commutator barrel 156 is fixably attached to the control piston 92, and a plurality of spring contacts 158 are supported within the cylinder 90 for axially slidably contacting a plurality of contact segments 160 that are fixably supported by the commutator barrel 156 as shown in FIG. 10 (and also in FIG. 8). More particularly, the spring contacts 158 include a forward contact 158A and a reverse contact 158B that axially slidably contact corresponding ones of the contact segments 160, designated forward segment 160A and reverse segment 160B as shown in FIG. 11, for interrupting power to the control motor 146 at travel extremities of the control piston 92. Separate forward and reverse windings of the motor 146 are series-connected through the contact segments 160A and 160B and the spring contacts 158A and 158B to the control switch 106, which can be a double-throw, center-off rocker switch for bidirectional activation of the control motor 146.

The forward segment 160A is foreshortened for breaking contact with the forward contact 158A in a fully advanced position of the control piston 92 corresponding to the feathered position of the rack yoke 20 of the propeller unit 12. Similarly, the reverse segment 160B is foreshortened for breaking contact with the forward contact 158B in a fully retracted position of the control piston 92, the retracted position (which corresponds to the reverse position of the rack yoke 20 as described above in connection with FIG. 7) being shown in FIGS. 8 and 10. The contact segments 160A and 160B (not shown in FIGS. 8 and 10) are imbedded in angularly spaced relation projecting from the commutator barrel 156, and the spring contacts 158A and 158B (also not being shown in FIGS. 8 and 10) are supported in corresponding angular relation within the control cylinder 90, the contacts 158 being clamped within a cup member 159 by a ring member 161, the members 159 and 161 being formed of suitable insulative materials. A 12 volt DC gear reduction motor suitable for use as the motor 146 is available as No. 455A104-2 from TRW Globe Motor Division, Dayton, Ohio.

Another spring contact 158, designated indicator contact 158C, slidably contacts additional contact segments 160 for sequentially activating a plurality of colored illuminators 162 of the display 108 in response to axial movement of the control piston 92. As shown in FIG. 11, the illuminators 162 include a feathered illuminator 162F, a feathering illuminator 162X, a high pitch illuminator 162H, a low pitch illuminator 162L, a neutral illuminator 162N, and a reverse illuminator 162R, each being activated by the indicator contact 158A making electrical contact with a corresponding contact segment 160, the corresponding contact segments 160 being individually designated 160F, 160X, 160H, 160L, 160N, and 160R. (A reduced complement of contact segments 160 associated with the spring contact 158C is depicted in FIGS. 8 and 10.) The illuminators 162 can be differently colored —red, orange, yellow, green, blue, and violet for signifying reverse, neutral, low pitch, high pitch, feathering, and feathered conditions, respectively, of the propeller unit 12.

With further reference to FIG. 12, an alternative configuration of the control circuit, designated 100', is adapted for applications not requiring a feathered condition of the propeller unit 12, including single-engine air and marine craft. Particularly, the contact segments 160 contacted by the indicator contact 158C include counterparts of the contact segments 160H, 160L, 160N, and 160R only, these segments being correspondingly wired to counterparts of the illuminators 162H, 162L, 162N, and 162R. In this configuration, suitable colors for the illuminators are blue for reverse (162R), amber for neutral (162N), green for low pitch (162L), and blue for high pitch (162H). These indicator lights are normally used in conjunction with operation of the ignition (which can be a selectively activated dual-ignition system) and observation of a tachometer. It will be understood that greater or smaller numbers of the illuminators 162 and associated contact segments 160 associated with the indicator contact 158C may be employed within the scope of the present invention. For example, four of the illuminators 162 can also be used when feathered pitch is provided, by activating a single illuminator (162L) for the full normal pitch range (low to high), and substituting the feathered illuminator 162F for the illuminator 162H in the four-illuminator example last described above, a suitable color arrangement being red for feather (162F), green for normal (high to low, 162L), amber for neutral (162N), and blue for reverse (162R).

In a further alternative, and as described in Applicant's co-pending application Ser. No. 09/418,967 that was filed on Oct. 14, 1999, the motor 146 can be connected in a conventional control circuit (not shown) that is responsive to operator input and feedback from a rotary position encoder for signaling rotation of the ballscrew 126. Further, the control circuit can include various combinations of portions of the control circuit 80 and that described in the above-referenced pending application, which is incorporated herein by these references.

While not described in detail, the propeller system 10 is contemplated to be provided with suitable seals which can include resilient O-ring members for sealing the cap assembly 70, and provisions for safety-wiring appropriate ones of the various fasteners in a conventional manner.

Although the present invention has been described in considerable detail with reference to certain preferred versions thereof, other versions are possible. For example, a single, larger and centrally located cap screw can be substituted for the plurality of cap screws 78 that engage each of the plug members 79, the respective blade pinions 22 being connected to the socket member 77 by other suitable means. Alternatively, the pinion shaft 25 can be integrally formed with the socket member 77. Therefore, the spirit and scope of the appended claims should not necessarily be limited to the description of the preferred versions contained herein.

What is claimed is:

1. A variable pitch propeller apparatus comprising:
   (a) an input shaft for coupling to a rotary power source on a drive axis;
   (b) a plurality of propulsion blades rotatably supported relative to the drive shaft on respective blade axes, the blade axes diverging from the drive axis;
   (c) an actuator having a yoke member supported relative to the drive shaft for movement therewith and coupled to the propulsion blades for rotation thereof about respective ones of the blade axes, the yoke member having a normal range of yoke positions from a high pitch position to a low pitch position, and an additional yoke position outside of the normal range, the propulsion blades having a corresponding normal pitch angle range including a high pitch angle and a low pitch angle, and an additional pitch angle outside of the normal pitch angle range corresponding to the additional yoke position; and (d) a centrifugal lock mechanism for blocking the movement of the yoke member from the normal range of yoke positions toward the additional yoke position in response to rotational speed of the input shaft being greater than a predetermined threshold speed.

2. The propeller apparatus of claim 1, wherein the lock mechanism comprises:

(a) a stop member rigidly connected to the yoke member and having a shoulder surface oriented generally perpendicular to a direction of movement of the yoke member;

(b) a mass element coupled to the input shaft for movement from an unlock position to a lock position displaced outwardly from the drive axis relative to the unlock position in response to centrifugal force, the mass element moving in predetermined relation to the drive shaft, the mass element in the lock position thereof blocking the lock member and the yoke member from moving from the normal range of yoke positions toward the additional yoke position by engagement with the shoulder surface; and (c) means for biasing the mass elements toward the unlock position.

3. The propeller apparatus of claim 2, wherein the lock member is a first lock member and the mass element is a first mass element, the lock mechanism also including a second lock member and a second mass element symmetrically located opposite the drive axis, and wherein the means for biasing comprises a tension spring coupled between the first and second mass elements.

4. The propeller apparatus of claim 1, wherein the additional yoke position is a feathered position opposite the high pitch position from the low pitch position, the propulsion blades having a corresponding feathered pitch angle.

5. The propeller apparatus of claim 1, wherein the additional yoke position is a reverse yoke position opposite the low pitch position from the high pitch position, the propulsion blades having a corresponding reverse pitch angle.

6. The propeller apparatus of claim 1, wherein the additional yoke position is a first additional yoke position, the yoke member also having a second additional position opposite the normal range of yoke positions from the first additional yoke position, the propulsion blades having corresponding first and second additional pitch angles.

7. The propeller apparatus of claim 6, wherein the first and second additional pitch angles are respective feathered and reverse pitch angles, the reverse pitch angle being spaced at least 100 degrees from the feathered angle.

8. The propeller apparatus of claim 6, wherein the lock mechanism comprises:

(a) a stop member rigidly connected to the yoke member and having oppositely facing shoulder surfaces oriented generally perpendicular to a direction of movement of the yoke member;

(b) a mass element coupled to the input shaft for movement from an unlock position to a lock position displaced outwardly from the drive axis relative to the unlock position in response to centrifugal force, the mass element moving in predetermined relation to the drive shaft, the mass element in the lock position thereof blocking the lock member and the yoke member from moving:

(i) from the normal range of yoke positions toward the first additional position by engagement with the first shoulder surface; and (ii) from the normal range of yoke positions toward the second additional yoke position by engagement with the second shoulder surface; and (c) means for biasing the mass element toward the unlock position.

9. The propeller apparatus of claim 1, wherein the threshold speed is not greater than 1500 RPM.

10. The propeller apparatus of claim 9, wherein the threshold speed is approximately 1200 RPM.

11. The propeller apparatus of claim 1, wherein the actuator comprises an annular hydraulic cylinder rotatably supported relative to the drive shaft, and an annular piston sealingly movable in the hydraulic cylinder for axially displacing the yoke member.

12. The propeller apparatus of claim 11, further comprising an antifriction thrust bearing interposed between the yoke member and the annular piston, the annular hydraulic cylinder having means for preventing rotation thereof during rotation of the input shaft.

13. The propeller apparatus of claim 1, wherein the actuator is a hydraulic actuator having an actuator piston and a fluid port, the apparatus further comprising a hydraulic control unit connectable to the power actuator for controllably advancing the actuator piston, comprising:

(a) a housing having a primary hydraulic cylinder formed therein;

(b) a control piston sealingly slidably engaging the primary hydraulic cylinder for forming a closed fluid cavity of variable volume, the fluid cavity being in fluid communication with the fluid port when the control unit is connected to the actuator; and (c) a lead screw rotatably supported in the housing and having a lead screw nut assembled thereto, the nut being threadingly engaged with the lead screw and rigidly connected to the control cylinder, the lead screw being rotatably supported within the housing for advancing the control piston at high mechanical advantage in response to rotation of the lead screw, whereby the pitch of the blades is adjustable in response to rotation of the lead screw.

14. The propeller apparatus of claim 13, wherein the lead screw nut is configured as an antifriction nut that is threadingly engaged with the lead screw by means of a plurality of rollingly interposed elements, the lead screw being axially supported within the housing by an antifriction thrust bearing.

15. The propeller system of claim 13, wherein the control unit further comprises an indicator spring contact supported relative to the housing, and a plurality of indicator contact members supported relative to the lead screw nut for sequential engagement by the indicator spring contact in response to rotation of the lead screw for signaling positions of the control piston to an external device.

16. The propeller system of claim 15, further comprising a plurality of display elements electrically connected to respective ones of the indicator contact members for activation in corresponding positions of the control piston.

17. The propeller system of claim 16, wherein the display elements are differently colored illuminators.

18. The propeller system of claim 13, wherein the control unit further comprises:

(a) a control motor coupled to the lead screw for reversibly driving same in response to respective forward and reverse drive signals;

(b) respective forward and reverse spring contacts supported relative to the housing, and respective forward and reverse contact members supported relative to the lead screw nut for sliding engagement by corresponding ones of the spring contacts, each of the forward and reverse drive signals being fed serially through corresponding ones of the spring contacts and contact members to the control motor; and (c) each of the forward and reverse contact members being foreshortened in a direction corresponding to movement of the lead screw nut in response to activation of a respective one of the drive signals for deactivating the control motor at opposite extremities of travel of the control piston.

19. The propeller apparatus of claim 1, comprising two of the blade members, the blade members projecting from opposite sides of the hub.

20. A variable pitch propeller apparatus comprising:

(a) an input shaft for coupling to a rotary power source on a drive axis;

(b) an annular hydraulic cylinder rotatably supported relative to the input shaft on the drive axis;

(c) an annular piston sealingly engaging the hydraulic cylinder for axial movement relative thereto in response to applied hydraulic pressure;

(d) a plurality of propulsion blades rotatably supported relative to the drive shaft on respective blade axes, the blade axes diverging from the drive axis;

(e) a yoke member supported relative to the drive shaft for axial movement therewith and being coupled to the propulsion blades for rotation thereof about respective ones of the blade axes in response to axial movement of the annular piston, the yoke member having a range of axial positions from a feathered position through a high pitch position and a low pitch position to a reverse pitch position, the propulsion blades having corresponding feathered, high pitch, low pitch, and reverse pitch angles; and (f) a centrifugal lock mechanism for blocking the axial movement of the yoke member from the high pitch position toward the feathered position, and from the low pitch position toward the reverse position in response to rotational speed of the input shaft being greater than a predetermined threshold speed, the lock mechanism comprising:

(i) a pair of stop members rigidly connected to the yoke member on opposite sided of the drive axis, each of the stop members having oppositely facing shoulder surfaces oriented generally perpendicular to the drive axis;

(ii) a pair of mass elements coupled to the input shaft on opposite sides of the drive axis for movement from respective unlock positions to respective lock positions displaced outwardly from the drive axis relative to the unlock positions in response to centrifugal force, the mass elements in the lock positions thereof blocking the lock members and the yoke member from moving from the normal range of yoke positions toward the feathered position by engagement with the first shoulder surfaces and from the normal range of yoke positions toward the reverse yoke position by engagement with the second shoulder surfaces; and (iii) a spring connected between the mass elements for biasing same toward the unlock position.

* * * * *